United States Patent [19]
Nell et al.

[11] Patent Number: 5,350,224
[45] Date of Patent: Sep. 27, 1994

[54] BRAKE-PRESSURE CONTROL DEVICE FOR A ROAD VEHICLE

[75] Inventors: Joachim Nell, Ostfildern; Manfred Steiner, Winnenden; Georg Coermann, Stuttgart, all of Fed. Rep. of Germany

[73] Assignee: Mercedes-Benz AG, Fed. Rep. of Germany

[21] Appl. No.: 134,836

[22] Filed: Oct. 12, 1993

[30] Foreign Application Priority Data

Oct. 9, 1992 [DE] Fed. Rep. of Germany ........ 4234043

[51] Int. Cl.$^5$ ............................ B60T 8/44; B60T 13/52
[52] U.S. Cl. ............................. 303/113.3; 303/113.4; 188/356; 60/547.1; 91/376 R
[58] Field of Search ................... 303/113.3, 113.4, 3, 303/15; 188/356, 357; 60/547.1; 91/376 R

[56] References Cited

U.S. PATENT DOCUMENTS

| | | | |
|---|---|---|---|
| 3,470,695 | 10/1969 | Kilb ........................ | 188/357 X |
| 4,057,301 | 11/1977 | Foster ...................... | 303/113.4 X |
| 4,453,380 | 6/1984 | Meynier ................... | 60/547.1 X |
| 5,096,267 | 3/1992 | Volz ........................ | 303/113.3 |
| 5,098,170 | 3/1992 | Watanabe ................. | 303/113.3 |
| 5,105,721 | 4/1992 | Furuta et al. ............. | 91/376 R |
| 5,219,442 | 6/1993 | Burgdorf et al. ......... | 303/113.3 X |

FOREIGN PATENT DOCUMENTS 4208496 8/1993 Fed. Rep. of Germany .

Primary Examiner—Robert J. Oberleitner
Assistant Examiner—Peter M. Poon
Attorney, Agent, or Firm—Evenson, McKeown, Edwards & Lenahan

[57] ABSTRACT

A brake-pressure control device for a road vehicle with a hydraulic brake system has a pneumatic brake booster provided with a change-over device which changes over the brake booster to a mode with an increased boost factor when the speed with which the driver actuates the brake pedal exceeds a threshold value. A reaction piston of the axial force-transmission train, leading from the brake pedal via the reaction piston, a flexible reaction element and the driving piston of the brake booster to the master cylinder, is constructed in two parts. One of the two part-pistons engages axially on the reaction element and the other of the part-pistons acts as a valve element of the inlet valve and via which the driving chamber of the brake booster can be exposed to the ambient pressure. The two part-pistons have complementary threads which engage one another. The pedal-side part-piston can be driven by a device on an electric motor with the effect of shortening the total length of the reaction piston and is activated in the direction of rotation when the actuating speed of the brake pedal is higher than the threshold value.

20 Claims, 3 Drawing Sheets

BRAKE-PRESSURE CONTROL DEVICE FOR A ROAD VEHICLE

BACKGROUND AND SUMMARY OF THE INVENTION

The present invention relates to a brake-pressure control device for a road vehicle having a hydraulic multi-circuit braking system, and, more particularly, to a brake-pressure control device in which there is provided for generating the brake pressures to be fed into the wheel brakes a master cylinder which can be actuated by means of a pedal-controlled pneumatic brake booster provided with a change-over device which responds to the actuating behavior of the driver and which causes an automatic change-over of the brake booster from a value of the boost factor required for limited braking to a higher value of the boost factor required for full braking, at least in the event that the speed $\dot{\phi}$ with which the driver actuates the brake pedal in the introductory phase of a braking operation exceeds a threshold value.

Generally speaking, a brake-pressure control device is provided in a brake system in which a master cylinder actuatable by a pedal-controlled pneumatic brake booster generates the brake pressures to be fed into the wheel brakes. The control device includes a change-over device which responds to the actuating behavior of the driver and brings about an automatic change-over of the brake booster from a value of the boost factor required for limited braking to a higher value of the boost factor required for full braking, at least in the event that the speed $\dot{\phi}_s$ with which the driver actuates the brake pedal in the introductory phase of a braking operation exceeds a threshold value $\dot{\phi}_s$. A brake-pressure control device of this type is the subject of the applicant's earlier German unpublished patent application P 42 08 496.2.

In the aforementioned brake-pressure control device, the vacuum brake booster is provided with a solenoid-valve arrangement which, by actuation with an electrical output signal from the electronic control unit, can be driven out of the basic position, in which a control channel of the control part of the brake booster, via which pressure compensation can take place between the vacuum chamber and the driving chamber of the brake booster, is connected to communicate with the vacuum chamber; the driving chamber is shut off from the outside atmosphere, into an energized operating position in which the driving chamber of the brake booster is loaded with the ambient pressure via a throughflow path opened in this operating position and belonging to the solenoid-valve arrangement, but the control channel is shut off from the vacuum chamber.

The basic position of the solenoid-valve arrangement is assigned to the non-actuated state of the brake system and its limited-braking mode. The valve arrangement is changed over into its energized position when, during the actuation of the brake pedal, the threshold value $\dot{\phi}_s$ of the actuating speed is exceeded. The control channel of the control part is guided outwards via a flexible line and a bushing of the housing of the vacuum chamber. The solenoid valve is arranged in the outer space of the vacuum chamber and, in its basic position, connects this bushing to a second bushing leading back into the vacuum chamber. In the energized operating position of the solenoid valve, which is assumed when the valve is actuated by an output signal characteristic of the exceeding of the threshold value $\dot{\phi}_s$ of the actuating speed of the brake pedal, the first bushing is shut off from the second bushing and the latter is instead connected to the outside atmosphere, so that the brake booster works with maximum brake boosting.

The brake-pressure control device explained thus far has the disadvantage in functional terms that, when the change-over device responds, the increase in brake force takes place, as it were, abruptly. For a minimum response time, it is virtually impossible for the driver to influence the brake force, and this can considerably impair at least the driving comfort during a braking operation. A constructional disadvantage is that the solenoid valve arranged outside the housing of the brake booster requires considerable space which is exceedingly difficult to provide in the conventional arrangement of the booster/master-cylinder unit in the upper rear part of the engine space, where the hydraulic unit of an anti-lock system, which necessary in combination with the brake-pressure control device, is also often accommodated.

An object of the present invention is, therefore, to improve a brake-pressure control device to the effect that, while having an improved response behavior in the sense of better metering of the brake force or vehicle deceleration, it can nevertheless be produced with a small space requirement.

This object has been achieved, according to the present invention, by providing that the reaction piston is of two-part design and comprises a first part-piston which can be supported axially on the reaction disc and which is guided axially displaceably, but non-rotatably, on the housing part carrying the reaction disc, as well as a second part-piston which forms the sealing flange of the inlet valve and which is rotatable, the two part-pistons being in engagement with one another via complementary threads extending in the axial direction; the change-over device comprises an electric motor of reversible direction of rotation, by means of which the second part-piston can be driven in rotation via a reduction gear, while, in the event that the driver actuates the brake pedal at high speed at the start of a braking operation, an activation of the electric motor takes place in that direction of rotation which ensures that the relative rotational movement of the two part-pistons leads to a shortening of the reaction piston as a whole and, at the latest at the end of a braking operation, an activation of the electric motor takes place in the opposite direction of rotation, until a position of the part-pistons of the reaction piston corresponding to a maximum length of the latter is reached again; the electric motor is arranged in a pedal-side end portion of the control-part housing, so as also to execute the movements of the latter, and is coupled in drive terms to the rotatable part-piston via a hollow shaft coaxially surrounding the pedal tappet.

Accordingly, a two-part construction is provided for the reaction piston, with a first piston element which can be supported axially on the reaction disc and which is guided axially displaceably, but non-rotatably, on the housing part carrying the reaction disc, and with a second piston element which forms the sealing flange of the inlet valve and which is rotatable. The piston elements of the reaction piston are in engagement with one another via complementary threads extending in the axial direction. The change-over device comprises an electric motor of reversible direction of rotation, by way of which the second piston element forming a sealing flange can be driven rotationally via a reduction gear, while, in the event that the driver actuates the brake pedal at high speed ($\dot{\phi} > \dot{\phi}_s$) at the start of a braking operation, an activation of the electric motor takes place in that rotation direction which ensures that the relative rotational movement of the two piston elements leads to a shortening of the reaction piston as a unit. At the latest at the end of a braking operation, an activation of the electric motor takes place in the opposite rotation direction, until a basic position, corresponding to a maximum length of the reaction piston, of its piston elements is again reached. The electric motor is arranged in a pedal-side end portion of the control-part housing so as also to execute the movements of the latter and is drivingly coupled to the rotatable reaction-piston element via a hollow shaft coaxially surrounding the pedal tappet.

An advantage of the brake-pressure control device according to the present invention is that, when the change-over device responds, the brake force does not abruptly assume a high value, but increases continuously with a time behavior predetermined by the speed of the electric motor. The pedal reaction detectable by the driver is essentially that the brake pedal can be actuated with little force until the brake booster finally reaches the drive level, that its driving chamber is under atmospheric pressure and a further increase in brake pressure, without boosting, takes place only in correlation with an increase in the force with which the driver actuates the brake pedal. Since the forces necessary for the opening actuation of the inlet valve of the brake-pressure control device according to the present invention are low, the control motor can be a motor with a power consumption of a few watts, i.e. of sufficiently small construction to ensure that it can be installed in the pedal-side end portion of the control-part housing with its motor shaft parallel to the central axis of the control part. The motor drives, via a pinion of small diameter, a gearwheel which is connected rotationally fixedly to the hollow shaft and the diameter of which is between three (3) and eight (8) times larger than that of the pinion in order to ensure a sufficient reduction of the motor speed.

Both in reigns of as space-saving a form of construction as possible and from the point of view of an exact mounting of the hollow shaft provided for the opening control of the inlet valve, it is especially advantageous if the hollow shaft is mounted slidably on a cylindrical portion of the pedal tappet passing centrally through the control-part housing, which achieves a large "bearing length", within which transverse forces acting on the reduction gearwheel connected to the hollow shaft can be absorbed effectively.

If, as in the preferred configuration of the brake-pressure control device, the reaction-piston element engaging on the reaction disc is a threaded cap whose thread is in engagement over a portion of its length with an end portion, configured as a threaded bolt, of the rotatable reaction-piston element, and, in combination therewith, the reaction-piston element supportable on the reaction disc can be supported axially on a stop element arranged fixedly relative to the control-part housing, after a small initial portion of the relative stroke of the two reaction-piston elements has taken place in the event of an activation of the brake-pressure control device, then the brake-pressure control device can also be utilized for an automatic actuation of the brake system. That is, an actuation takes place without the cooperation of the driver, for example for the purpose headway control and/or drive-slip control and/or for an activation, desirable for other reasons relating to driving dynamics, of one or more wheel brakes of the vehicle.

In one particularly advantageous embodiment of the brake-pressure control device of the present invention, the valve spring, which urges the annular disc valve element of the control part of the brake booster into bearing contact with the seat of compensating valve and with the reaction-piston element of the inlet valve and which, in a conventional brake booster, is supported on an annular shoulder of the pedal tappet, is supported on a radially inward-projecting supporting flange of a flanged sleeve. The latter is inserted firmly into the control-part housing, and the rotatable hollow shaft which prevents the valve spring from being supported on the pedal tappet, passes through the flanged sleeve.

The objects of the present invention are also achieved in that the housing-side valve element of the compensating valve, on which the valve element in the annular disc form can be supported by its radially outer region, comprises a sleeve-shaped part which is guided on the control-part housing displaceably in a pressure-tight manner in the axial direction. The sleeve-shaped part is in engagement, via a thread extending in the axial direction over a length portion of the sleeve casing, with a complementary thread of a rotatably mounted hollow shaft which, in the tubular portion of the control-part housing through which the pedal tappet passes centrally, coaxially surrounds the latter at a radial distance and is sealed off from the tubular portion of the control housing and which can be driven in rotation by an electric motor of reversible rotational direction, provided as an actuating device of the change-over device, but is secured against axial displacement within the control-part housing, while, in the event of an actuation of the brake pedal taking place at excessive speed ($\dot{\phi} > \dot{\phi}_s$), the electric motor is activated in that rotation direction in which the axial displacement, resulting from the rotation of the hollow shaft, of the sleeve-shaped compensating-valve element, on which is supported the annular-disc shaped valve element, which is also a valve element of the inlet valve, leads to a lifting off of the annular-disc shaped valve element from the sealing face of the reaction piston. At the latest at the end of the brake actuation the electric motor is driven in that rotation direction in which the axial displacement, resulting therefrom, of the sleeve-shaped compensating-valve element once again returns into the basic position of the annular-disc shaped valve element. The basic position corresponds to the blocking state of the inlet valve.

The immediately-above-described embodiment of the brake-pressure control device provides, both an initiation of a braking operation with a very rapid rise in brake pressure and an automatic actuation of the brake system, as is necessary, for example, for a headway-control mode or a drive-slip control mode.

If the electric motor, which can once again be rated at an advantageously low power consumption, is accommodated in a pedal-side end portion of the control-part housing and the reduction ratio of the gear formed by a driving pinion of the motor and a driving toothing of the hollow shaft is between $\frac{1}{4}$ and $\frac{1}{8}$, then it is especially advantageous if the toothing with which the driving pinion of the electric motor meshes is configured as an internal toothing arranged on the pedal-side end portion of the hollow shaft. This allows an especially space-saving arrangement of the electric drive motor which can then be accommodated for the most part within the clear cross-section of the tubular portion of the control-part housing.

The necessary securing of the axially displaceable valve element of the compensating valve can be achieved in a simple way by a small tube which forms part of the passage channel connecting the vacuum chamber to the annular space of the control part communicating with the vacuum chamber and which starts from the valve element and is displaceable in a pressure-tight manner in a housing bore otherwise limiting the channel.

In order to hold the annular-disc shaped valve element in the form of an annular disc securely in the position necessary for the various valve functions, the valve spring urging this valve element into bearing contact with the axially movable rib-shaped valve element of the compensating valve of the control part is supported on an inner radial step of a flanged sleeve which coaxially surrounds the pedal tappet at a clear radial distance. The flanged sleeve also has an outer radial step, on which the sealing cuff is supported axially and, via a casing-shaped portion of the flanged sleeve connecting the two steps to one another, radially, and is held in sealing bearing contact with the inner cylindrical surface of the rotatable hollow shaft. The flanged sleeve is arranged rotationally fixedly within the control-part housing.

The relevant securing of the flanged sleeve against rotation can be achieved in a simple way in that the flanged sleeve is provided, within a casing portion pointing towards the sealing element in the form of an annular disc, with a transverse bolt passing through a long hole of the pedal tappet which is itself non-rotatable as a result of connection to the brake pedal.

BRIEF DESCRIPTION OF THE DRAWINGS

These and further objects, features and advantages of the present invention will become more apparent from the following detailed description thereof when taken in conjunction with the accompanying drawings wherein.

DETAILED DESCRIPTION OF THE DRAWINGS

Figure 1:
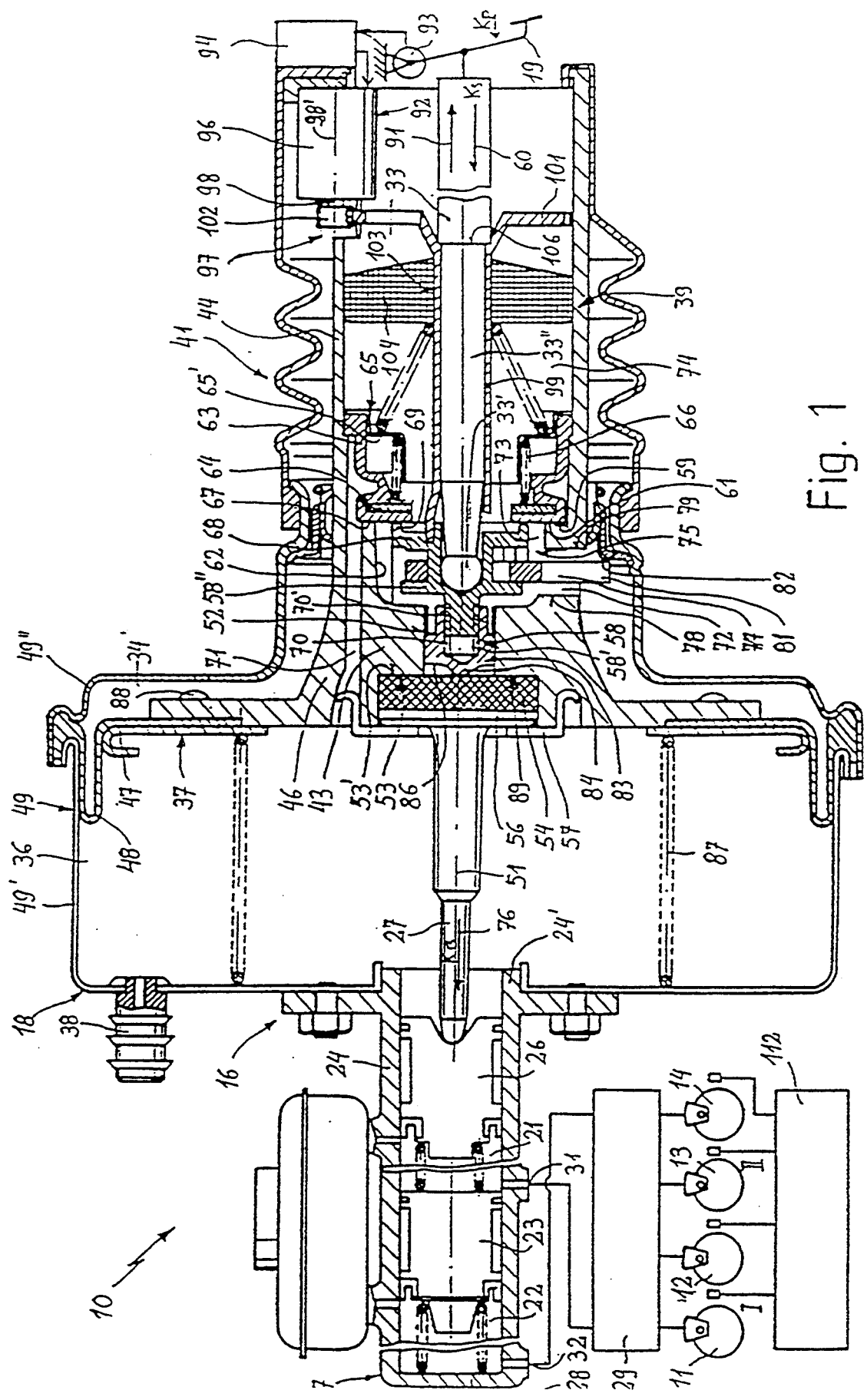
FIG. 1 is a longitudinal sectional view of a road vehicle brake system in which the brake system is equipped with a brake-pressure control device according to the present invention but is shown in simplified form in order to explain its functioning.

In FIG. 1, an overall hydraulic dual-circuit brake system of a road vehicle is designated generally by the numeral 10 and not otherwise shown. A brake-pressure control device according to the present invention is integrated into the brake system 10, the purpose of which control device is to "recognize", from the way in which the driver actuates the brake system, whether the driver wishes to execute a limited braking taking place with moderate vehicle deceleration or intends full braking with as high a vehicle deceleration as possible. If the latter is the case, the control device then controls automatically the generation of as high a brake force as possible which the driver could not apply by actuating the brake system 10 alone, that is to say without increased auxiliary force, at least not quickly enough.

In the brake system 10, in which the front-wheel brakes 11, 12 are combined into a front-axle brake circuit I and the rear-wheel brakes 13, 14 are combined into a rear-axle brake circuit II, a brake unit, designated generally by numeral 16 supplies brake pressure to the brake circuits I and II and comprises a static tandem master cylinder 17 and a pneumatic brake booster 18. The brake unit 16 can be actuated by a brake pedal 19, via which the driver selects the vehicle deceleration meeting his requirements in a braking operation.

The tandem master cylinder 17 has a primary outlet-pressure space 21 assigned to the front-axle brake circuit I and a secondary outlet-pressure space 22 assigned to the rear-axle brake circuit II. The pressure spaces 21, 22 are delimited from one another in an axially movable pressure-tight manner, within the housing 24 of the master cylinder 17, by way of a floating piston 23. The second axially movable limitation of the primary outlet-pressure space 21 is formed by a primary piston 26 on which the actuating force boosted by the pneumatic brake booster 18 is applied via a push rod 27, and the second axial limitation of the secondary outlet-pressure space 22 is formed by an end wall 28 of the master-cylinder housing 24.

It is presupposed, furthermore, that the vehicle is equipped with a conventional anti-lock system known construction and functioning, which, in the event of a braking operation, if necessary causes a brake-pressure regulation which is compatible with a dynamically stable behavior of the vehicle and which also leads to an optimum or at least approximately optimum vehicle deceleration.

This anti-lock system is represented in FIG. 1 merely by its diagrammatically indicated hydraulic unit 29 which is inserted between the pressure outlets 31 and 32, assigned to the two brake circuits I, II, of the tandem master cylinder and the front-wheel brakes 11, 12 as well as the rear-wheel brakes 13, 14. The anti-lock system 29 comprises electrically activatable brake-pressure regulating valves and return pumps (not shown) assigned to the brake circuits I, II. A more detailed explanation of the anti-lock system 29, which can be produced in any way known from the art of anti-lock systems, is not considered necessary, since basically any type of anti-lock system is suitable in conjunction with the brake-pressure control device provided within the framework of the brake system 10.

The control principle, adopted in the brake-pressure control device of the brake system 10 and taken as a basis for the exemplary embodiments to be explained below, is to change over the degree of boosting A of the pneumatic brake booster 18, defined as the ratio $K_B/K_S$ of the actuating force $K_B$, which can be exerted on the primary piston 26 of the tandem master cylinder 17 via the push rod 27 of the brake booster 18, to the control force $K_S$, introduced via the pedal tappet into the brake booster 18, essentially in the axial direction once again, to a value $A_V$ increased in relation to the value $A_Z$ governing limited braking, when the driver actuates the brake pedal 19 very quickly, as a result of which the brake control device "recognizes" that the driver would like to initiate full braking or at least wants a high vehicle deceleration. This ensures that as great a drive level as possible of the brake booster 18 is achievable at the earliest possible moment during the braking operation and that the high brake force resulting therefrom is limited, if necessary with the cooperation of the anti-lock system 29, to the effect that dynamically stable deceleration behavior of the vehicle remains guaranteed.

Before details of change-over devices suitable for changing over to increased boost factors A of the brake booster 18 are explained by reference FIGS. 1 to 3, its construction and functioning, as presupposed in principle in all the illustrated embodiments, will first be discussed.

The pneumatic brake booster 18 is configured as a single-acting pneumatic cylinder which has a driving piston 37 which movably delimits a driving chamber 34 from a vacuum chamber 36 in a pressure-tight manner and which engages axially, via the push rod 27, on the primary piston 26 of the tandem master cylinder 18. The vacuum chamber 36 of the brake booster 18 is connected via a connection piece 38 to the suction connection (not shown) of the vehicle 15 engine, so that, when the vehicle engine is in operation, a pressure of approximately 0.3 bar prevails in the vacuum chamber 36, i.e. a pressure which is 0.7 bar lower than the ambient atmospheric pressure.

The radially inner central part of the driving piston 37 is formed by the essentially pot-shaped housing, designated generally by the numeral 39, of a control part, designated generally by the numeral 41, of the brake booster 18. In terms of its functioning, the brake booster 18 is a proportional valve which feeds a pressure proportional to the force $K_P$ with which the driver actuates the brake pedal 19 into the driving chamber 34 of the brake booster 18. The maximum value of this pressure corresponds to the ambient pressure (1 bar). The pneumatic brake booster 18 is sized so that its boost factor has a value of around 4, that is to say the actuating force $K_B$ introduced to the primary piston 26 of the tandem master cylinder 17 via the push rod 27 is approximately four times greater than the control force $K_S$ which is introduced into the control part 41 via the pedal tappet 33 and, for its part, corresponds to the force $K_P$, which is multiplied by the pedal step-up ratio, with which the driver actuates the brake pedal 19.

The pot-shaped housing 39 of the control part 41 has a solid block-shaped bottom 43, from which, pointing towards the brake pedal 19, the casing region 44 of the pot-shaped housing 39 extends. A conically widening flange 46 which adjoins in a pressure-tight manner the inner edge of the driving piston 37 which, in terms of basic shape, is in the form of a circular disc points towards the driving piston 37 of the brake booster 18, and has an outer edge region 47 sealingly adjoining the brake-booster housing designated generally by the numeral 49, via a rolling diaphragm 48 which, in the outermost peripheral edge region, forms the delimitation of the vacuum chamber 36 from the driving chamber 34 of the brake booster 18.

The tandem master cylinder 17 is attached in a coaxial arrangement relative to the central longitudinal axis 51 of brake booster 18 in a pressure-tight manner to the brake booster housing part 49' which forms the limitation of the vacuum chamber 36 fixed relative to the housing, and projects, with its tubular end portion 24' receiving the primary piston 26, into the vacuum chamber 36 of the brake booster 18.

The block-shaped bottom part 43 of the housing 39 has a central passage bore 52 which opens into a flat pot-shaped depression 53 of the control-part housing 39. The depression 53 is arranged on the side of the control-part housing 39 facing the master cylinder 17, into which depression 53, an elastic reaction element 54 in the form of a thick-walled circular disc is inserted. The reaction element 54 fills the largest part of the interior of the pot-shaped depression 53 and, in covering the mouth orifice of the passage bore 52 of the block-shaped bottom part 43 located on the same side as the vacuum chamber 36, bears over a large area against the radial annular shoulder 53 of the bottom part 43 surrounding this mouth orifice. The bearing area corresponds approximately to three times the clear cross-sectional area of the central passage bore 52 of the bottom part 43.

The push rod 27 provided for introducing the actuating force $K_B$ into the brake unit is supported on the reaction element 54 by a flange 56, of which the bearing face relative to the reaction disc 54 corresponds to its base area. The push rod 27 is held in bearing contact with the reaction disc 54 by the return springs of a tandem master cylinder 17, even in the non-actuated state of the brake system, and is secured by a restraining sleeve 57 against disengagement from the depression 53 of the block-shaped bottom 43 of the control-part housing 42.

A reaction piston designated generally by the numeral 58 is guided axially displaceably in the central passage bore 52 of the control-part housing bottom 43. The control force $K_S$ is applied on the reaction piston 58 in the direction of the arrow 60 and acts via the pedal tappet 33 when the brake system 10 is actuated.

The block-shaped bottom part 43 of the control-part housing 39 is provided with an annular groove 59 which is open towards the pedal side and the radially outer limitation of which is formed by the inside of the tubular casing part of the control-part housing 39. The radially inner limitation of the annular groove 59 is formed by an annular rib 61 which also marks the radial limitation of a cylindrical pot-shaped depression 62 of the block-shaped bottom part 43, within which depression 62 the passage bore 52, in which the reaction piston 58 is guided displaceably, opens out centrally.

An annular disc 64 is arranged within that region of the casing 44 of the control-part housing 39 which is adjacent to the annular rib 61 in the axial direction and is worked into a sealing cuff 63. The annular disc 64 sealingly adjoins the casing 44 of the control-part housing 39 via the sealing cuff 63, is axially movable with the radial extent of its disc plane and is urged, by a valve spring 66 supported on a radial annular shoulder 65' of a flanged sleeve 65 firmly inserted into the casing region 44 of the control-part housing 39 and coaxially surrounding the pedal tappet 33 at a clear radial distance, into sealing bearing contact with the narrow annular end face 67 of the annular rib 61 of the block-shaped bottom part 43 of the control-part housing 39.

The reaction piston 58 is of two-part construction. One part is a piston part 58' which is supported axially on the reaction disc 54 and is located on the same side as the push rod 27 which guides the reaction piston 58 axially displaceably in the central passage bore 52 of the block-shaped bottom part 43 of the control-part housing 39. The other part of the reaction piston 58 is a pedal-side piston part 58" on which is engaged the pedal tappet 33 motionally coupled to the brake pedal 19. These two part-pistons 58'; 58" of the reaction piston 58 are in positive self-locking engagement with one another via complementary threads 70; 70'.

The pedal-side part-piston 58" of the reaction piston 58 is the part-piston receiving the ball-headed end 33' of the pedal tappet 33 in a blindhole-shaped depression and passing through the pot-shaped depression 62 of the block-shaped bottom part 43. The part-piston 58 has, within the depression 62, a radial end flange 68 whose outside diameter is smaller than the inside diameter of the depression 62 bounded by the annular rib 61, but is larger than the inside diameter of the annular disc 64 embedded in the sealing cuff 63. The radial end flange 68 of the reaction piston 58 has, in the peripheral region of its end face confronting the annular disc 64, a slightly axially projecting annular rib 69, via which the reaction piston 58 is supportable on a radially inner region, which acts as a sealing face, of the annular disc 64 surrounded by the cuff 63.

The control-part housing 39 is provided, in a radially outer region of its block-shaped bottom part 43, with a vacuum channel 71 connecting the vacuum chamber 36 to the annular groove 59. Furthermore, the block-shaped bottom part 43 is provided with a radial slot 72 which is configured in the form of a long hole in the axial direction and connects the driving chamber 34 in a communicating manner to the pot-shaped depression 62 of the bottom part 43. Together with the annular space 73 limited by the depression 62 and the part-piston 58", the radial slot 72 forms an atmosphere channel 75, via which, air can flow out of the interior 74 of the control part 41 when the annular rib 69 of the pedal-side part-piston 58" of the reaction piston 58 is lifted off the annular disc 64. With the interior being under atmospheric pressure and limited radially on the outside by the pedal-side end portion of the housing casing 44, air can flow into the driving chamber 34, with the result that the latter comes under a pressure $P_S$ which is increased in relation to the pressure prevailing in the vacuum chamber 36. As a result, the driving piston 37 and, therewith, the push rod 27 of the brake booster 18 experience a displacement in the direction of the arrow 76 of FIG. 1 which is the brake-pressure build-up direction.

The pedal-side part-piston 58" of the reaction piston 58 is provided with a stop bar 77 which is connected firmly to the part-piston 58" and passes in the radial direction through the slot 72 forming part of the atmosphere channel 75. The clear axial diameter of the slot 72 is larger than that of the stop bar 77. Axially possible relative movements of the reaction piston 58 as a whole in relation to the housing 39 of the control part 41 are limited in one direction by the stop bar 77 bearing against the radial limitation 78, facing the reaction element 54, of the radial slot 72 and, in the opposite direction by the stop bar 77 bearing against the opposite tappet-side limitation 79 of the slot 72.

The stop bar 77 whose free end portion 81 projecting radially from the slot 72 bears against an annular shoulder 82 of the housing part 49" limiting the driving chamber 34 of the brake booster 18 fixedly relative to the housing, also causes a pedal-side limitation of the return stroke of the reaction piston 58 linked to a return movement of the brake pedal 19 and, by virtue of this stop position, also marks the basic position of the reaction piston 58 which is assumed before the vehicle engine is switched on and, with the vehicle engine running, before or at the start of a braking operation.

The part-piston 58' of the reaction piston 58 located on the same side as the push rod 27 is supported on the reaction element 54 via a supporting element 83 having a central bus 84 which projects towards the reaction element 54 and which adjoins, with a smooth curve, a radially extending supporting face 86 of the supporting element 83. The supporting element 83 can thus come into bearing contact with the reaction element 54 within the central bore 52, in which the reaction piston 58 is guided displaceably by its part-piston 58' located on the same side as the push rod.

The brake booster 18 explained above and thus far also for present discussion is assumed to be known, with the exception of the two-part configuration of the reaction piston 58, functions in the following manner. As long as the vehicle engine has not been started up, both the vacuum chamber 36 and the driving chamber 34 of the brake booster 18 are under atmospheric pressure, and the driving piston 37 of the brake booster 18 is urged, by a return spring 87 supported on the bottom of the flat pot-shaped housing part 49' limiting the vacuum chamber 36 fixedly relative to the housing, into its basic position which is linked to a minimum volume of the driving chamber 34. This basic position is marked by the bearing of the bottom part 43 of the control-part housing 39 with the one limitation 78, on the same side as the reaction element, of the blind bore 72 against the stop bar 77 which is itself supported axially on the annular shoulder 82 of the housing part 49" forming the limitation, fixed relative to the housing, of the driving chamber 34 and/or is marked by the bearing of the driving piston 37 with supporting projections 88, arranged in the peripheral edge region 47 of the driving piston, against the housing part 49" limiting the driving chamber 34 fixedly relative to the housing. In this basic position of the driving piston 37 of the brake booster 18, of the housing 39 of its control part 41 and of its reaction piston 58, the annular disc 64 is supported on the outer annular end face 67 of the annular rib 61, but is lifted off from the annular rib 69 of the radial end flange 68 of the pedal-side part-piston 58" of the reaction piston 58, with the result that the interior 74 of the housing 39 of the control part 41, the interior being under atmospheric pressure, is communicatedly connected, via the atmosphere channel 75, to the driving chamber 34, but this is shut off from the vacuum chamber 36.

As soon as the vehicle engine is running and the pressure in the vacuum chamber 36 decreases, the driving piston 37, which is loaded with the atmospheric pressure in the driving chamber 34, experiences a displacement directed towards the master cylinder 17. As a result, the annular disc 64 also experiences a displacement directed towards the reaction piston 58 which remains held in its basic position by way of the initially prevailing prestress exerted by the reaction element 54 which is now decreasing. As a result of this displacement, the annular disc 64 comes into sealing bearing contact with the axially projecting annular rib 69 of the radial end flange 68 of the pedal-side part-piston 58" of the reaction piston 58, with the result that the connection of the interior 74 of the control-part housing 39, which interior is under atmospheric pressure, to the driving chamber 34 of the brake booster 18 is shut off. Since this driving chamber 34 is until then still under atmospheric pressure, a further displacement of the driving piston 37 and, therewith, of the control-part housing 39 towards the master cylinder 17 takes place, with the result that the outer annular rib 61 of the block-shaped bottom part 43 of the control-part housing 39 lifts off from the annular disc 64 and communicating connection is now made, via the vacuum channel 71 and the gap opened up between the annular disc 64 and the annular rib 61 as well as the atmosphere channel 75, between the vacuum chamber 36 and the driving chamber 34 which thereby likewise comes under a vacuum. Consequently, the return spring 87 can urge the driving piston 37 back again, until the position of equilibrium, shown in FIG. 1, is reached. In that position, the annular disc 64 bears sealingly both against the outer annular rib 61 of the block-shaped bottom part 43 of the control-part housing 39 and against the axially projecting annular rib 69 of the radial end flange 68 of the pedal-side part-piston 58~ of the reaction piston 58 and thereby shuts off both the vacuum chamber 36 from the driving chamber 34 and the latter from the interior 74 of the control-part housing 39, which interior is under atmospheric pressure. In this position of equilibrium, the pressure prevailing in the driving chamber 34 is slightly higher than the pressure which prevails in the vacuum chamber 36 and which, when the engine is in operation, has a typical value of 0.2 bar.

When the brake system 10 is actuated, the control force $K_s$, being exerted via the pedal tappet 33 on the reaction piston 58, in the direction of the arrow 60, the reaction piston 58 experiences a displacement directed towards the reaction disc 54 and relative to the control-part housing 39. As a result, the axial annular rib 69 of the radial end flange 68 of the pedal-side part-piston 58" of the reaction piston 58 lifts off from the annular disc 64, so that, via the annular gap thereby opened up, the interior 74 of the control-part housing 39, which interior is under atmospheric pressure, comes into communicating connection with the driving chamber 34 via the atmosphere channel 75 and the driving piston 37 of the brake booster 18 is thereby loaded with increased pressure on one side. This results, on the one hand, in a displacement of the pistons 26, 23 of the tandem master cylinder 17 and therefore a build-up of a brake pressure $P_B$ leading to a reaction force $K_R$ which is given by the relation $$K_R = F \cdot P_B,$$

in which F denotes the effective cross-sectional area of the primary piston 26 of the master cylinder 17. This reaction force $K_R$ is for a predominant part supported via the flange 56 of the push rod 27 and the reaction disc 54 on the annular face 89, located opposite the flange 56, of the bottom of the flat pot-shaped depression 53 receiving the disc-shaped reaction element 54, while, in the central region of the reaction element 54, the reaction piston 58 is supported axially, with the effective cross-sectional area $F_K$ of its part-piston 58' located on the same side as the push rod, on the elastic reaction element 54. Thus, there also acts on the reaction piston 58 a reaction force $K_{sr}$ which is directed opposite to the control force $K_s$, and the amount of which is proportional to the effective cross-sectional area $F_K$ of its part-piston 58' located on the same side as the push rod.

By way of the return force $K_{sr}$ which acts on the reaction piston 58 as a whole and the amount of which increases with an increasing amount of the brake pressure $P_B$, the reaction piston 58 experiences, relative to the control-part housing 39, a displacement in the direction of the arrow 91 which brings the axial annular rib 69 of the radial end flange 68 of the pedal-side part-piston 58" of the reaction piston 58 into bearing contact with the annular disc 64 again. As a result, the atmosphere channel 75 is once more shut off from the interior 74 of the control-part housing 39, and the pressure in the driving chamber 34 is maintained at the value reached up to the shutting off of the atmosphere channel 75.

In the position of the reaction piston 58 thus assumed within the housing 39 of the control part 41, both the inlet valve formed by the annular rib 69 of the pedal-side part-piston 58" of the reaction piston 58 and the annular disc 64 and the compensating valve of the control part 41 are closed. The compensating valve is formed by this annular disc 64 and the annular rib 61 of the control-part housing 39, 43. There is equality of the control force $K_s$, and of the reaction force $K_{sr}$ acting in the opposite direction, i.e. a position of equilibrium of the reaction piston 58 and of the driving piston 37 of the brake booster 18 which corresponds to an expected value, linked to the actuating or control force $K_s$, of the vehicle deceleration which the driver would like to achieve.

On the assumption of a, as it were, "hydrostatic" behavior of the reaction disc 54 consisting of a flexible elastomer, the boost factor A of the pneumatic brake booster 18, occurring in the state of equilibrium, is given by the following relationship:

$$A = (F_r + F_k)/(F_k),$$

in which $F_r$ denotes the amount of the annular face 89 on which the reaction disc 54 is supported on the bottom of the depression 53 located on the same side as the push rod, of the control-part housing 39, and $F_k$ denotes the effective cross-sectional area of the part-piston 58' being located on the same side as the push rod, of the reaction piston 58, by way of which the reaction piston 58 engages in the central region of the reaction disc 54. In the illustrated embodiment, the amount $F_r$ of the annular face 89 is approximately three times larger than the cross-sectional area $F_k$ of the part-piston 58' of the reaction piston, and the part-piston is located on the same side as the push rod, with a value of around 4 thus being obtained for the boost factor A.

When the driver, starting from a position of equilibrium of the reaction piston 58 or of the brake pedal 19 corresponding to a desired vehicle deceleration, reduces the actuating force, the reaction piston 58 experiences relative to the control-part housing 39 a displacement. As a result, the annular disc 64, "taken up", as it were, by the reaction piston 58, lifts off from the outer annular rib 61, with the result that, via the annular gap thus opened up, the vacuum chamber 36 now comes into communicating connection with the driving chamber 34 of the brake booster 18 via the vacuum channels 71, the annular gap opened up and the atmosphere channel 75. The driving chamber 34 is thereby relieved of pressure to decrease the force acting on the driving piston 37 which now follows the pedal release movement until the driver holds the brake pedal 19 in a position corresponding to a desired lower brake force. The vacuum channel 71 is once again shut off from the atmosphere channel 75 as soon as the outer annular rib 61 of the control-part housing 39 comes into bearing contact again with the annular disc 64.

So that, if required, when the driver would like to achieve braking with as high a vehicle deceleration as possible and therefore actuates the brake pedal 19 at a speed higher than a predetermined or predeterminable threshold value $\phi_s$, a change-over device, designated generally by the numeral 92 is provided to assure that the brake booster 18 is changed over automatically to a clearly increased value $A_{max}$ of the boost factor. In the illustrated embodiment according to FIG. 1, the change-over device 92 works on the principle of reducing the effective length of the reaction piston 58, measured between the reaction element 54, on which the reaction piston 58 is supported by way of its part-piston 58' located on the same side as the push rod, and the annular-disk form valve element 64, on which the reaction piston 58 is supported axially by its pedal-side part-piston 58", as soon as the speed $\dot{\phi}$ with which the brake pedal 19 is actuated when the braking operation is initiated exceeds the said threshold value $\dot{\phi}_s$. For the relevant recognition of the pedal-actuating speed $\dot{\phi}$, there is provided a pedal-position sensor 93 which is an angular transmitter and which generates electrical output signals, from the evaluation of which an electronic control unit 94 (shown schematically), recognizes how quickly the driver actuates the brake pedal 19 and, when the threshold value $\dot{\phi}_s$ of the actuating speed is exceeded, generates an output signal. As a result, the change-over device 92 is activated with the effect of a shortening of the reaction piston 58 at a specific speed dl/dt which, depending on the design of the electronic control unit, can correspond to a fixed value or can also be correlated with the recorded pedal-actuating speed $\dot{\phi}$, expediently such that the speed dl/dt of the change in effective length of the reaction piston 58 becomes higher as the actuating speed of the brake pedal 19 becomes higher.

The result of the shortening, taking place at a constant or varying speed dl/dt and continuous in the mathematical sense, of the effective length 1 of the reaction piston 58 of the control part 41 is that an opening actuation of the inlet valve 64, 69, via which the control part interior 74, which is under atmospheric pressure, can be communicatingly connected to the driving chamber 34 of the brake booster 18, is also possible when, after the change-over device 92 has responded, the driver simply keeps the force with which he actuates the brake pedal 19 constant, that is to say depresses the brake pedal 19 as far as becomes possible as a result of the shortening of the reaction piston 58, thus corresponding to an operating mode of the brake booster 18 with an increasing boost factor.

The shortening of the reaction piston 58 is here achieved in that its pedal-side part-piston 58" is driven, by an electric motor 96 which can be activated by the electronic control unit 94 and the direction of rotation of which is reversible, via a simple reduction gear, designated generally by the numeral 97, first in that direction of rotation which ensures that the relative movement of the two part-pistons 58' and 58" resulting from the threaded engagement thereof results in the shortening of the reaction piston 58.

The electric motor 96 is firmly mounted within the pedal-side end portion of the tubular control-housing part 44, with the axis of rotation 98 of its motor shaft 98 running parallel to the central axis 51 of the control part 41 and with the radial distance between the axis of rotation 98 and the central longitudinal axis 51 of the control part 41 corresponding approximately to half the diameter of the tubular portion 44 of the control-part housing 39, so as also to execute the movements of the part 44, and, via the reduction gear 97, drives a hollow shaft 99 which is connected rotationally fixed to the pedal-side part-piston 58" of the reaction piston 58 and coaxially surrounds the pedal tappet 33 and to the pedal-side end portion of which is connected rotationally fixed a spur gearwheel 101. The diameter of the gearwheel 101 corresponds approximately to the inside diameter of the tubular housing portion 44 and, in the embodiment illustrated, is approximately six times larger than the diameter of the driving pinion 102 which is connected firmly to the motor shaft 98 of the drive motor 96 and with which the spur wheel 101 of the hollow shaft 99 is in meshing engagement.

The hollow shaft 99 is mounted slidably on the inside on a cylindrical middle portion 33" of the pedal tappet 33 and likewise slidably on the outside in a central orifice 103 of an air filter 104 which forms, within the tubular portion 44 of the control-part housing 39, an air-permeable intermediate wall, by which the control-part housing interior 74, which is under atmospheric pressure, is delimited from the pedal-side end portion of the control-part housing 39, within which end portion the electric motor 96 and the reduction gear 97 are arranged.

The hollow shaft 99 is supported axially on a radial step 106 of the pedal tappet 33. The step 106 is arranged within the outer end portion of the tubular housing part 44 near the pedal 19, so that it also executes the axial movements of the pedal tappet 33 which occur relative to the control-part housing 39. A sufficient axial dimensioning of, for example, the driving pinion 102 of the electric motor 96 ensures that, the meshing engagement of the spur wheel 101 with the driving pinion 102 is maintained in each position of the pedal tappet 33.

In the embodiment in FIG. 1, the part-piston 58' of the reaction piston 58 located on the same side as the push rod is configured as a threaded cap with an internal thread 70 meshing with an axial portion, configured as a threaded bolt with an external thread 70', of the pedal-side part-piston 58" of the reaction piston 58. The securing of the part-piston 58' located on the same side as the push rod against rotation in the central bore 52 of the block-shaped bottom part 43 can be obtained by the engagement of a pin (not shown) projecting radially from the part-piston 58' with an axial inner groove of the block-shaped housing part 43 which opens into the cylindrical pot-shaped depression 62 of the block-shaped housing part 43 and which terminates at a short axial distance from the depression 53 of the block-shaped housing part 43, which depression 53 receives the reaction disc 54.

The possible stroke of the relative movements of the part-pistons 58' and 58" which can be achieved by rotating the pedal-side part-piston 58" of the reaction piston 58 corresponds to the maximum opening stroke of the inlet valve 64, 69 formed by the annular disc valve element 64 and by the radial end flange 68 of the pedal-side part-piston 58, so that the maximum possible boost factor $A_{max}$ can be utilized up to the drive level of the brake booster 18.

Figure 2:
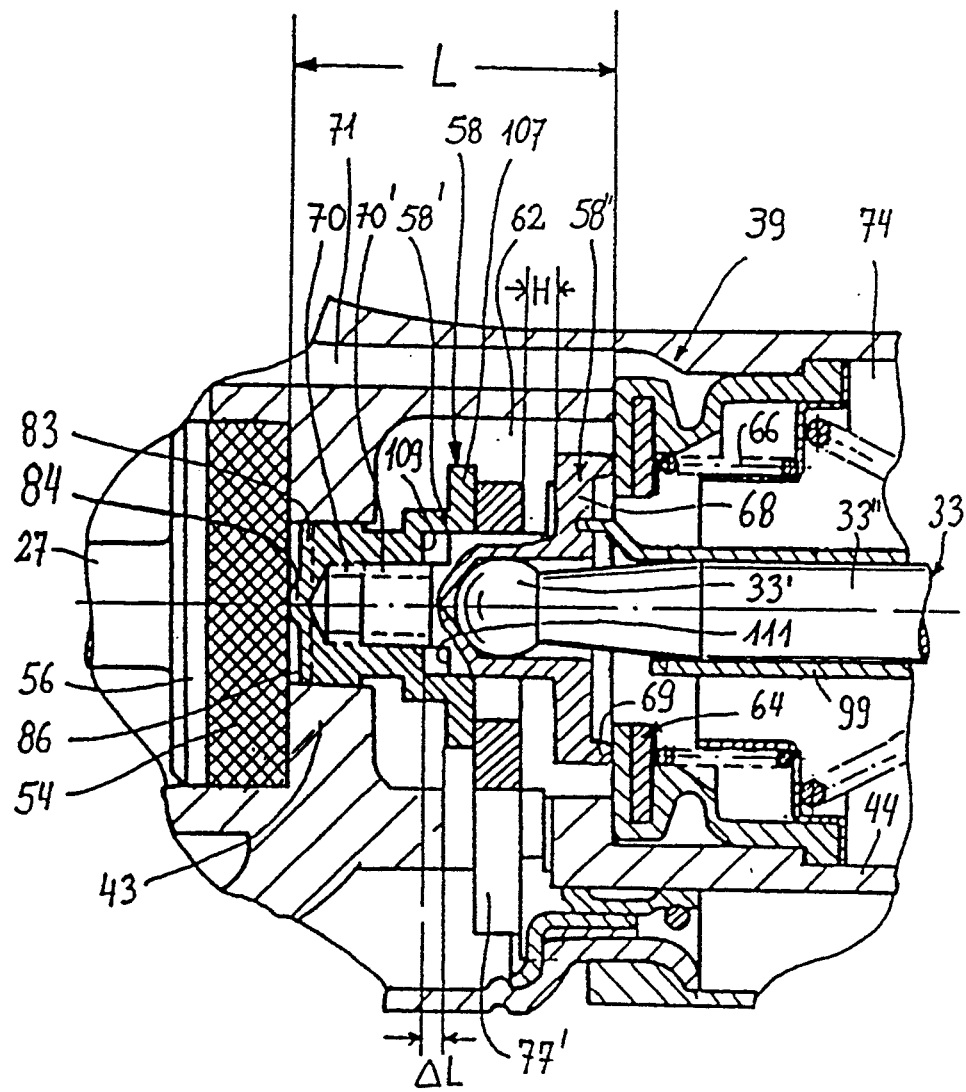
FIG. 2 is a partial, sectional view of another embodiment of the brake-pressure control device according to FIG. 1.

In the embodiment of FIG. 2, the brake-pressure control device is provided within the framework of the brake system 10 according to FIG. 1 and differs therefrom in constructional terms only in the configuration of the two part-pistons 58', 58" of the reaction piston 58 and in that the stop bar 77' is a part which is connected firmly to the control-part housing 39 within the pot-shaped depression 62 and relative to which the part-pistons 58', 58" (and therefore the reaction piston 58) as a whole are axially displaceable. Otherwise, the embodiment of the brake-pressure control device shown in FIG. 2 is identical in constructional terms to the embodiment illustrated in FIG. 1. The same reference symbols used in FIG. 1 are also used for designating elements of the brake-pressure control device in FIG. 2, to show the constructional equality and/or analogy of the respective parts designated identically and, in so far as such parts are not specifically explained below, to contain a reference to the description of such elements which is given with respect to FIG. 1. The same statement also apply to the embodiment of FIG. 3, also explained below.

In the embodiment illustrated in FIG. 2, the part-piston 58′, which can be supported axially on the reaction disc 54 and which, being in engagement via its internal thread 70 with the thread 70′ of the bolt-shaped end portion of the pedal-side part-piston 58″ of the reaction piston 58, is axially displaceable by way of the rotational drive of the reaction piston 58, has a radial supporting flange 107 which starts from a pot-shaped extension of the cap-shaped piston part of the part-piston 58′, which piston part is provided with the internal thread 70. In the basic position of the part-pistons 58′, 58″ of the reaction piston 58 shown in FIG. 2 and which, with the vehicle engine running, corresponds to the non-actuated state of the brake system, the reaction piston 58 is supported axially, by way of the radial supporting flange 107 of the part-piston 58′ engaging on the reaction disc 53, on the stop bar 77′ connected fixedly to the housing 39 of the control part 41.

The maximum opening stroke H of the inlet valve 64, 69, i.e. the maximum value of the clear axial distance which the radial end flange 68 of the pedal-side part-piston 58″ of the reaction piston 58 can assume from the valve element formed by the annular disc 64 and the cladding of the latter, is determined by the clear distance which, in the illustrated basic position of the part-pistons 58′ and 58″, is present between the stop bar 77′ and the side of the radial end flange 68 facing the latter.

The maximum amount $\Delta L$, by which the length $L$, given in the illustrated basic position, of the reaction piston 58 can be reduced by rotating the pedal-side part-piston 58″ relative to the part-piston 58′ located on the same side as the push rod, is determined by the distance, in this basic position, between the bottom face 109 of the pot-shaped extension 108 of the part-piston 58′ located on the same side as the push rod and the annular end face 111, located opposite the bottom face 109, of the pedal-side part-piston 58″, from which annular end face extends the end portion of the pedal-side part-piston 58″ extends from the annual end face 111, and the end portion is configured as a threaded bolt. This maximum amount $\Delta L$ of the possible changes in length of the reaction piston 58 is 10% to 20% smaller than the maximum opening stroke H of the inlet valve 64, 69.

As regards the change-over of the brake booster to a mode with a higher boost factor when the driver actuates the brake pedal 19 at high speed, ($\dot{\phi} > \dot{\phi}_S$), the functioning of the brake-pressure control device with the configuration of the reaction piston 58 shown in FIG. 2 is completely analogous to the exemplary embodiment illustrated in FIG. 1. However, the configuration of the brake-pressure control device according to FIG. 2 affords the possibility of brake actuation without the cooperation of the driver, in that the part-piston 58′ of the reaction piston 58 located on the same side of the push rod is supported on the stop bar 77′ fixed relative to the control-part housing. Therefore, when the change-over device 92 is actuated and consequently the hollow shaft 99 is driven in rotation, the part-piston 58′ opens the inlet valve 64, 69 positively, with the result that the driving chamber 34 of the brake booster 18 is loaded with a higher pressure than that prevailing in the vacuum chamber 36. This effect can also be obtained by utilizing the hydraulic unit 29 of the anti-lock system and its electronic control unit 112, for example for an automatic headway control when driving in a queue of traffic and/or for a drive-slip control by the selective actuation of the wheel brake of a driven vehicle wheel tending to spin, as well as, in general, for actuating one or more wheel brake(s) of the vehicle, in order to maintain the latter in a dynamically stable driving state.

Figure 3:
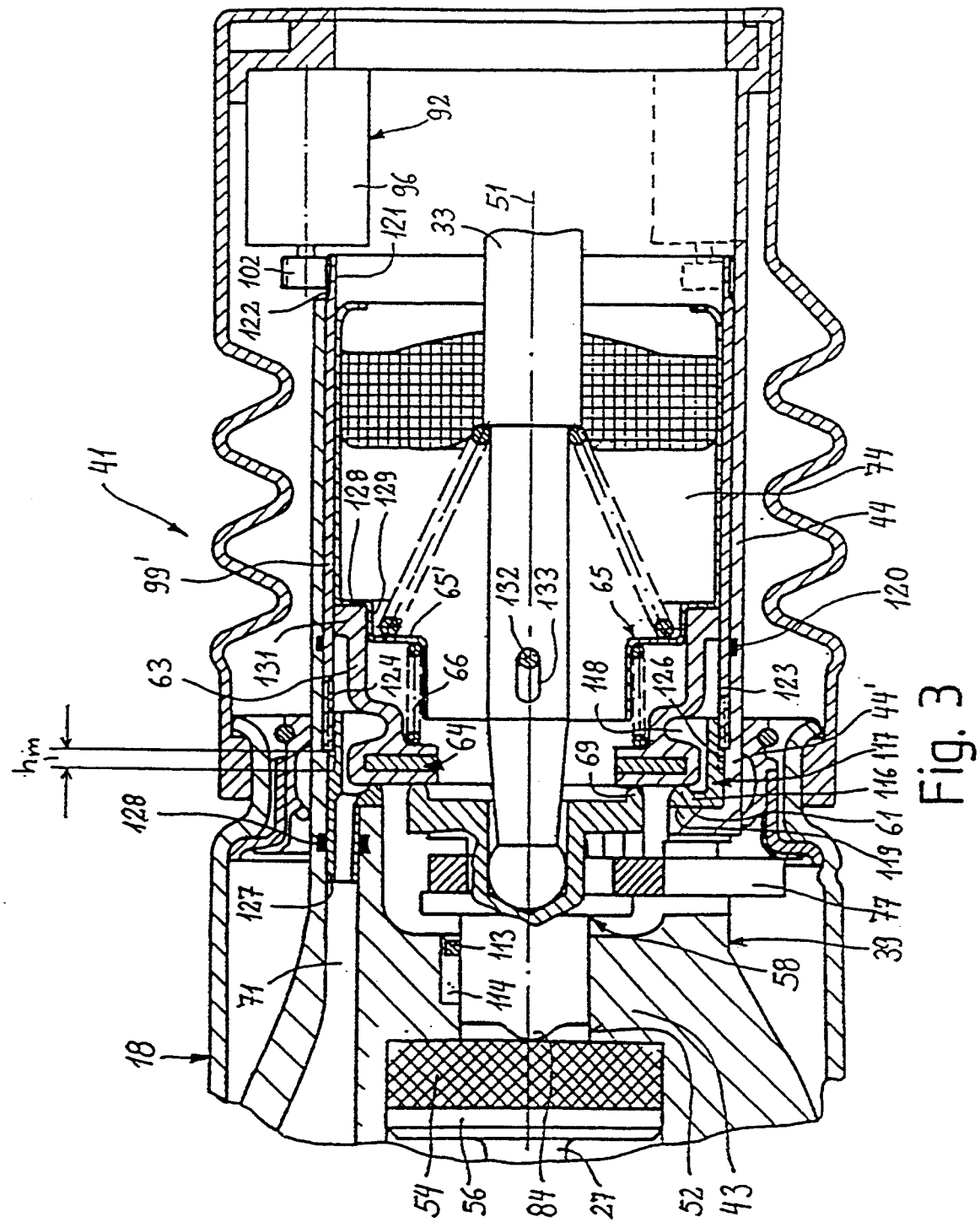
FIG. 3 is a partial, sectional view of yet a further embodiment of a brake-pressure control device which can be used within the framework of the brake system according to FIG. 1 and which is also suitable for an automatic braking mode.

The further embodiment of a brake-pressure control device illustrated in FIG. 3 shows the control part 41 of the brake booster 18 which is completely analogous in functional terms to the embodiment of FIG. 2, but differs therefrom in the manner of actuating the change-over device 92 and constructional details concerned therewith.

The reaction piston 58 is a one-piece part made of, for example, steel, to which the stop part 77 is connected fixedly, at least axially displacedly fixed. The piston 58 is axially displaceably guided in the central longitudinal bore of the solid block-shaped bottom part 43 of the control-part housing 39 and is secured against rotation about the central longitudinal axis 51 of the control part 41 by a radial pin 113 which is fixed relative to the piston and which projects into a groove 114 extending over some of the length of the central bore 52. The basic position of the control unit 41 and of its change-over device 92 is illustrated which position, with the vehicle engine running, corresponds to the non-actuated state of the brake system 10.

The use in FIG. 3 of reference symbols identical to reference symbols which denote constructional and functional elements of the control units described in FIGS. 1 and 2 denotes a reference to the parts of the description belonging to FIGS. 1 and 2.

The annular rib 61 forming the housing-side valve element of the compensating valve is arranged on the radially inner edge of a radially inward-projecting annular flange 116 of an otherwise cylindrical sleeve 117 which is mounted to be axially displaceable on the portion 44′, of the casing region 44 of the control-part housing 39, which portion 44′ directly adjoins the block-shaped bottom part 43 of the control-part housing 39. The sleeve 117 is arranged within the annular space 118 limited radially on the inside by the sealing cuff 63, into which is embedded the annular disc 64 which, together with its cladding, forms the annular-disc valve element 64 both of the compensating valve 61, 64 and of the inlet valve 69, 64 of the control part 41. The annular disc 64 is also axially displaceable only within this annular space 118, the maximum stroke $h_m$ of this displacement corresponding to the maximum opening stroke of the inlet valve 64, 69, insofar as this can be achieved solely by actuating the change-over device 92.

In the illustrated basic position of the valve elements of the control part 41 in FIG. 3, the sleeve 117 is supported directly with its radial annular flange 116 on the annular end face 119 of the block-shaped bottom part 43 of the control-part housing 39. The cylindrical casing region 44 extends from the annular end face 119. A thin-walled hollow shaft 99′ is inserted into the casing region 44 80 as to be rotatable, but axially non-displaceable and is sealed off from the casing region 44 by an annular gasket 120 fixed relative to the housing. The axially movable sleeve 117 is provided, on its side facing the annular end face 119 of the block-shaped bottom part 43, with an extension 127 which is in the form of a small tube and which projects into the vacuum channel 71 of the control-part housing 39 and is sealed off slidably from the latter by way of an annular gasket 128 fixed relative to the housing. The sleeve 117 is secured against rotation within the control-part housing 39 by the small tube-like extension 127.

The flanged sleeve 65 with its radially inner annular shoulder 65', forms the axial abutment for the valve spring 66 urging the annular disc valve element 64 into bearing contact with the annular rib 61 of the sleeve flange 116 as a valve seat of the compensating valve. With a radially outer shoulder 128 and with a short cylindrical casing portion 129 connects the latter to the radially inner annular shoulder 65', the flanged sleeve 65 keeps an outer edge bead 131 of the sealing cuff 63 in slidably sealing bearing contact with the inner cylindrical surface of the hollow shaft 99' rotationally drivable by way of the electric motor 96, and is secured against rotation within the control-part housing 39 by a transverse bolt 132 which is fixed relative to the sleeve and which passes through an axially extended long hole 133 of the pedal tappet 33.

A mode of the brake booster 18 with an increased boost factor is assigned that rotation direction of the electric motor 96 in which the cylindrical sleeve 117 experiences, as a result of the engagement of its thread 126 with the internal thread 124 of the hollow shaft 99', a displacement which is directed towards the driving side and as a result of which the annular disc valve element 64 is lifted off from the annular rib 69 of the end flange 68 of the reaction piston 58 and the inlet valve 64, 59 is thereby opened, via which inlet valve air can flow out of the control part interior 74, which is under atmospheric pressure, into the driving chamber 34 of the brake booster 18. As a result of such an actuation of the electric motor 96 of the change-over device 92, an actuation of the brake system, for example for the purpose of a headway control, is possible even when the driver does not actuate the brake pedal 19.

In order to achieve as space-saving a design of the change-over device 92 as possible, the free end portion 121 of the hollow shaft 99' can, as indicated by dotted lines in the bottom right-hand part of FIG. 3, also be provided with an internal toothing engaged by the driving pinion 102 of the electric motor 96 which can then be shifted radially further into the interior of the control-part housing 39. After the conclusion of a braking operation and/or a braking phase in which the increased boost factor of the brake booster 18 is to be utilized, the electric motor 96 is actuated until, and in that direction of rotation which ensures that, the sleeve 117 returns again to its basic position in which it is supported on the annular end face 119 of the block-shaped bottom part 43.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A brake-pressure control device for a road vehicle with a hydraulic multi-circuit brake system, comprising a master cylinder for generating the brake pressures to be fed into wheel brakes and a pedal-controlled pneumatic brake booster arranged to actuate the master cylinder and provided with a change-over device operative to respond to actuating behavior of a vehicle driver and to cause an automatic change-over of the brake booster from a boost factor value required for limited braking to a higher boost factor value required for full braking, at least in the event that a speed with which the vehicle driver actuates a brake pedal associated with the brake booster in an introductory phase of a braking operation exceeds a threshold value, (a) the brake booster having a vacuum chamber connected to a suction pipe of an engine of the vehicle and a driving chamber movably limited relative to said vacuum chamber via a driving piston and, via a control part functioning overall as a proportional valve, comprising an inlet valve and a compensating valve and actuatable by the brake pedal, is configured to be loaded with a pressure higher than the pressure prevailing in the vacuum chamber and being proportional to a regulating force exerted by the vehicle driver and introduced into the master cylinder via a pedal tappet, a reaction piston, a flexible reaction element and a push rod, which are supported axially with respect to one another in a mechanical series connection and which form a force-transmission train via which an actuating force is introduced into the master cylinder, and a reaction force resulting from generation of brake pressure reacts on the brake pedal, (b) the inlet valve comprising a flanged portion of the reaction piston arranged axially displaceably in a depression of a control-part housing, said depression being communicatingly connected with the driving chamber, and a valve element configured as an annular disc and sealingly supportable at an inner edge region on the flanged portion and connected in a pressure-tight manner, via a sealing cuff, to a radially outer boundary, formed by a tubular portion of the control-part housing, of an ambient pressure space through which the pedal tappet engaging on the reaction piston passes centrally, (c) the compensating valve comprising a seat coaxially surrounding the depression, in which a sealing flange of the reaction piston is axially displaceably arranged, and which delimits the depression from an outer coaxial annular space communicatingly connectable to the vacuum chamber via a housing channel, and a radially outer region of the annular disc valve element arranged to be urged by a valve spring into bearing contact with the seat, wherein (d) the reaction piston comprises a first part-piston supported axially on the reaction disc and guided axially displaceably and non-rotatably on the housing part carrying the reaction disc, and a rotatable second part-piston forming the sealing flange of the inlet valve, the first and second part-pistons being in engagement with one another via complementary threads extending in the axial direction;

(e) the change-over device comprises a rotationally reversible electric motor via which the second part-piston can be rotatably driven via a reduction gear, while, in the event that the vehicle driver actuates the brake pedal at a speed higher than a threshold value at the start of the braking operation, an actuation of the electric motor takes place in a rotational direction which ensures that relative rotational movement of the first and second part-pistons results in a shortening of the reaction piston overall and, at the latest at the end of the braking operation, an actuation of the electric motor takes place in an opposite rotational direction, until a position of the first and second part-pistons corresponding to a maximum length of the reaction piston is again reached; and (f) the electric motor is arranged in a pedal-side end portion of the control-part housing so as to execute movements of the control-part housing, and is drivingly coupled to the rotatable second part-piston via a hollow shaft coaxially surrounding the pedal tappet.

2. The brake-pressure control device according to claim 1, wherein the electric motor and a shaft thereof are arranged parallel to a central axis of the control part and, via a small diameter pinion, drives a gearwheel rotationally wherein said gearwheel is fixedly connected to the hollow shaft, the diameter of the gearwheel being between three times and eight times the pinion diameter.

3. The brake-pressure control device according to claim 1, wherein the hollow shaft is mounted slidably on a cylindrical portion of the pedal tappet.

4. The brake-pressure control device according to claim 3, wherein the electric motor and a shaft thereof are arranged parallel to a central axis of the control part and, via a small diameter pinion, drives a gearwheel rotationally wherein said gearwheel is fixedly connected to the hollow shaft, the diameter of the gearwheel being between three times and eight times the pinion diameter.

5. The brake-pressure control device according to claim 1, wherein the first part-piston is a threaded cap having a thread in engagement over a portion of a length thereof with an end portion of the rotatable second part-piston, said end portion being a threaded bolt.

6. The brake-pressure control device according to claim 5, wherein the electric motor and a shaft thereof are arranged parallel to a central axis of the control part and, via a small diameter pinion, drives a -gearwheel rotationally wherein said gearwheel is fixedly connected to the hollow shaft, the diameter of the gearwheel being between three times and eight times the pinion diameter.

7. The brake-pressure control device according to claim 6, wherein the hollow shaft is mounted slidably on a cylindrical portion of the pedal tappet.

8. The brake-pressure control device according to claim 1, wherein the first part-piston is supported axially on a stop element arranged fixedly relative to the control-part housing.

9. The brake-pressure control device according to claim 1, wherein the valve spring is supported on a radially inward-projecting supporting flange of a flanged sleeve inserted firmly into the control-part housing.

10. A brake-pressure control device for a road vehicle with a hydraulic multi-circuit brake system, comprising a master cylinder for generating the brake pressures to be fed into the wheel brakes and a pedal-controlled pneumatic brake booster arranged to actuate the master cylinder and provided with a change-over device operative to respond to actuating behavior of a vehicle driver and to cause an automatic change-over of the brake booster from a boost factor value required for limited braking to a higher boost factor value required for full braking, at least in the event that the speed with which the vehicle driver actuates a brake pedal associated with the brake booster in an introductory phase of a braking operation exceeds a threshold value, (a) the brake booster having a vacuum chamber connected to a suction pipe of an engine of the vehicle and a driving chamber limited movably relative to said vacuum chamber via a driving piston and, via a control part functioning overall as a proportional valve, comprising an inlet valve and a compensating valve and actuatable by the brake pedal, is configured to be loaded with a pressure higher than the pressure prevailing in the vacuum chamber and being proportional to a regulating force which is exerted by the vehicle driver and which is introduced into the master cylinder via a pedal tappet, a reaction piston, a flexible reaction element and a push rod, which are supported axially with respect to one another in a mechanical series connection and which form a force-transmission train via which an actuating force is introduced into the master cylinder, and the reaction force resulting from the generation of brake pressure reacts on the brake pedal, (b) the inlet valve comprising a flanged portion of the reaction piston arranged axially displaceably in a depression of a control-part housing, said depression being communicatingly connected to the driving chamber, and a valve element configured as an annular disc, sealingly supportable at an inner edge region on the flanged portion and connected in a pressure-tight manner, via a sealing cuff, to a radially outer boundary, formed by a tubular portion of the control-part housing, of an ambient pressure space through which the pedal tappet engaging on the reaction piston passes centrally, and (c) the compensating valve comprising a seat coaxially surrounding the depression, in which a sealing flange of the reaction piston is axially displaceably arranged, and which delimits the depression from an outer coaxial annular space communicatingly connected to the vacuum chamber via a housing channel, and a radially outer region of the annular disc valve element arranged to be urged into bearing contact with the seat by a valve spring, wherein a housing-side valve element of the compensating valve, on which the valve element is arranged to be at the radially outer region, comprises a sleeve-shaped part guided displaceably in a pressure-tight manner in an axial direction on the control-part housing and, via a thread extending in the axial direction over a portion of the length of a casing of the sleeve-shaped part, is in engagement with a complementary thread of a rotatably mounted hollow shaft which, in a tubular portion of the control-part housing coaxially surrounds and is radially spaced from the pedal tappet, and is sealed off from the tubular portion of the control-part housing, said hollow shaft being configured and arranged to be rotationally driven by means a reversible electric motor constituting an actuating device of the change-over device, said hollow shaft being secured against axial shifts within the control-part housing such that, in the event of actuation of the brake pedal taking place with excessive speed, the electric motor arranged to be actuated in a direction of rotation in which an axial shift, resulting from rotation of the hollow shaft, of the sleeve-shaped part, on which the valve element is supported and further constitutes a valve element of the inlet valve, results in a lifting off of the valve element from the inner edge region of the reaction piston, and, at the latest at an end of the brake actuation, the electric motor is actuated in a direction of rotation in which the resulting axial displacement of the sleeve-shaped part again returns to a basic position of the valve element which corresponds to a blocking state of the inlet valve.

11. The brake-pressure control device according to claim 10, wherein the electric motor is mounted on a pedal-side extension of the control-part housing.

12. The brake-pressure control device according to claim 10, wherein a driving pinion of the electric motor has a substantially smaller diameter than a toothing of the hollow shaft arranged to mesh with the driving pinion, which driving pinion diameter is in a ratio of between ⅛ and ¼ to a diameter of the hollow shaft.

13. The brake-pressure control device according to claim 12, wherein the electric motor is mounted on a pedal-side extension of the control-part housing.

14. The brake-pressure control device according to claim 12, wherein the toothing of the hollow shaft is an internal toothing arranged on the pedal-side end portion of the hollow shaft.

15. The brake-pressure control device according to claim 10, wherein the sleeve-shaped part is secured against rotation by a small tube forming a portion of the housing channel connecting the vacuum chamber to an annular space of the control part, said annular space communicating with said vacuum chamber, said small tube extending from the sleeve-shaped part and being displaceable in a pressure-tight manner in a housing bore otherwise limiting the housing channel.

16. The brake-pressure control device according to claim 10, wherein the valve spring is supported on an inner radial step of a flanged sleeve coaxially surrounding the pedal tappet at a clear radial distance and having an outer radial step on which the sealing cuff is supported axially and radially, via a casing-shaped portion of the flanged sleeve connecting the inner and outer radial steps, and is held in sealing bearing contact with an inner cylindrical surface of the rotatable hollow shaft, and the flanged sleeve is secured against rotation about a longitudinal axis of the control part within the control-part housing.

17. The brake-pressure control device according to claim 16, wherein the electric motor is mounted on a pedal-side extension of the control-part housing.

18. The brake-pressure control device according to claim 17, wherein a driving pinion of the electric motor has a substantially smaller diameter than a toothing of the hollow shaft arranged to mesh with the driving pinion, which driving pinion diameter is in a ratio of between ⅛ and ¼ to a diameter of the hollow shaft.

19. The brake-pressure control device according to claim 18, wherein the toothing of the hollow shaft is an internal toothing arranged on the pedal-side end portion of the hollow shaft.

20. The brake-pressure control device according to claim 19, wherein the sleeve-shaped part is secured against rotation by a small tube forming a portion of the housing channel connecting the vacuum chamber to an annular space of the control part, said annular space communicating with said vacuum chamber, said small tube extending from the sleeve-shaped part and being displaceable in a pressure-tight manner in a housing bore otherwise limiting the housing channel.

* * * * *